United States Patent

[11] 3,555,264

[72] Inventor Peter Schimmelpfennig
 Wedel, Germany
[21] Appl. No. 718,485
[22] Filed Apr. 3, 1968
[45] Patented Jan. 12, 1971
[73] Assignee Licentia Patent-Verwaltungs-G. m. b.H.
 Frankfurt am Main, Germany
[32] Priority Apr. 6, 1967
[33] Germany
[31] No. L56,185

[54] SEARCHLIGHT APPARATUS
 10 Claims, 8 Drawing Figs.
[52] U.S. Cl. .................................................... 240/3.1,
 240/46.03, 240/46.59
[51] Int. Cl. ..................................................... F21p 5/04
[50] Field of Search .......................................... 240/3.1,
 10.6S, DA, 46.03, 46.59, 3; 250(Inquired)

[56] References Cited
 UNITED STATES PATENTS
 1,268,162 6/1918 Scalbom ..................... 240/46.03

| 2,333,541 | 11/1943 | Madon ........................ | 240/10.6 |
| 2,591,419 | 4/1952 | Gheorghiu .................. | 240/23X |
| 3,360,642 | 12/1967 | DeVos et al. ................ | 240/3 |
| 3,426,189 | 2/1969 | Deputy ........................ | 240/46.59 |

Primary Examiner—John M. Horan
Assistant Examiner—Richard M. Sheer
Attorney—Spencer and Kaye ABSTRACT: Searchlight apparatus for selectively emitting a strong beam of white or infrared light for target finding purposes or a weak beam of light for nighttime assistance in a "passive-viewing" system. The searchlight includes a light source, a searchlight housing with a light-exit opening, an infrared filter arranged in the housing to be selectively swung into the path of the searchlight beam and a protective cover arranged to selectively close the light-exit opening. Another opening, substantially smaller than the light-exit opening, is provided in the protective cover with a red filter arranged therein. A shutter, arranged between the light source and the smaller opening, is also provided to selectively prevent light from passing through the red filter. An actuating device is included to automatically close the shutter when the light source is turned off.

Inventor:
Peter Schimmelpfennig
BY Spencer & Kaye
Attorneys

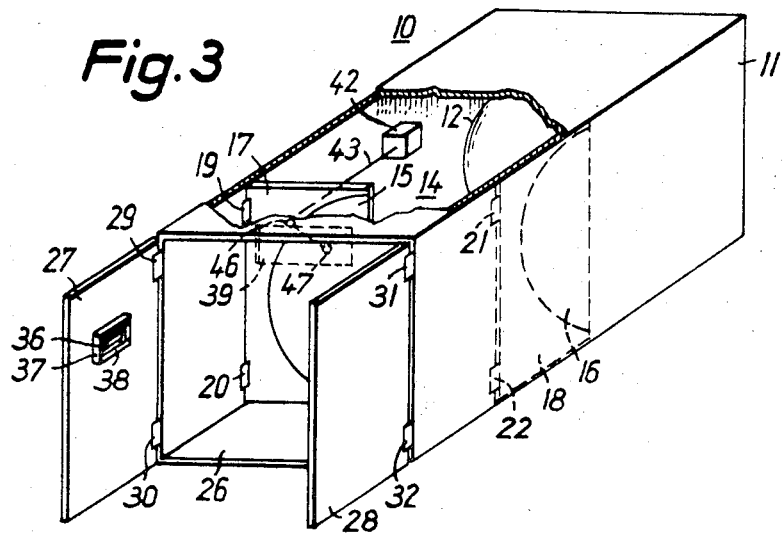
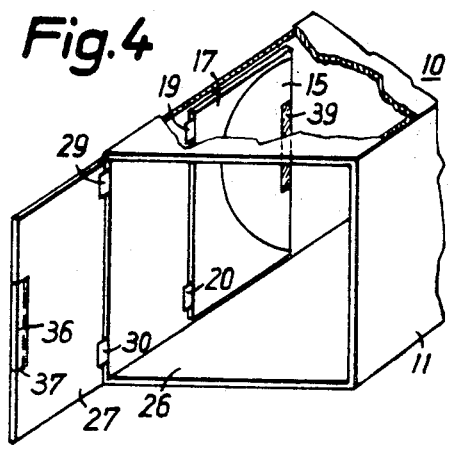
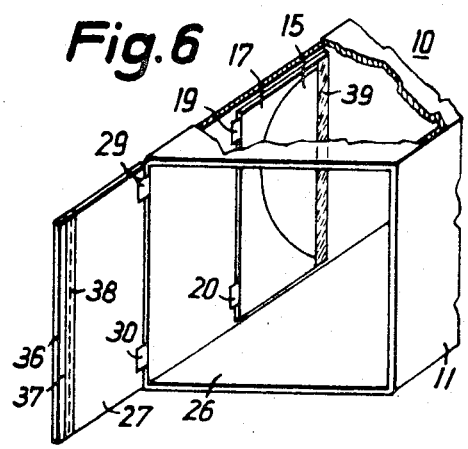
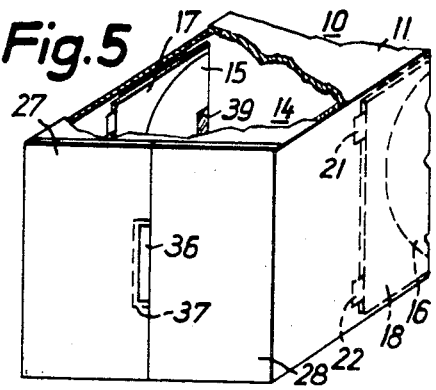
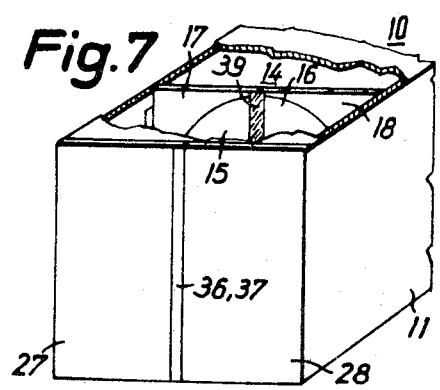

SEARCHLIGHT APPARATUS

BACKGROUND OF THE INVENTION

The present invention relates to a searchlight, and, in particular, a "target-finding" searchlight which can selectively emit visible or infrared radiation. For the emission of infrared light the housing of the searchlight is provided with an infrared filter which may be swung into the path of the searchlight beam. The searchlight housing is also provided with a protective cover which may be swung over the opening of the housing which serves as the light exit.

If a searchlight of the type to which the present invention relates is operated to emit white-light radiation, the protective cover on the light-exit opening of the searchlight housing is swung open. The infrared filter, which may be swiveled into the path of the searchlight radiation if infrared emission is desired, is arranged along the inside walls of the searchlight housing so that the white-light beam can emerge from the searchlight housing without interference. If the searchlight lamp is then switched off, the protective cover as well as the infrared filter flaps are constructed to automatically close over the light path of the searchlight. For infrared operation, then, only the protective cover need be opened when the searchlight is turned on.

Whether the searchlight is used to emit white-light or infrared, the protective cover of the searchlight is always swiveled in front of the light exit opening of the searchlight housing when the searchlight lamp is switched off. This measure is necessary after both modes of searchlight operation to prevent the emission of light produced by the afterglow of the lamp. Experience has shown that this light remains visible for approximately 2 minutes after the searchlight lamp is turned off, during which time it would still be possible to see a searchlight observer who, till then, had gone undetected. This source of danger is avoided by always closing the protective cover.

In addition to its use as a "target-finding" searchlight, a searchlight of the type described above can also be equipped with special apparatus to assist a "passive-viewing" system. Such a system consists, in principle, of a television camera and a television display device and is useful for daytime and especially nighttime observation. This purely passive form of observation is advantageous since the human observer can remain protected and out of sight.

A certain minimum degree of illumination of the object to be viewed is always required, however, for a "passive-viewing" system. If the illumination is less than this minimum, the sensitivity of the receiver will be insufficient to detect a picture so that the quality of the reproduced picture will fall off sharply. This minimum intensity of illumination, which lies in the region of $10^{-2}$ ux, is always present by daylight. It is also present at night due to the brightness of the moon and the stars, if the sky is clear. Already if the sky is slightly overcast, however, or during the period of a new moon, the quantity of illumination falls below the minimum value. In this case it is necessary to assist the "passive-viewing" system with an artificial light source. In many cases this assistance must also meet certain military requirements.

A light source employed to assist a "passive-viewing" system should neither emit easily visible white-light radiation, since that would immediately indicate the presence of the observing camera, nor should it emit invisible radiation exclusively because this long wavelength radiation will not be detected by the camera. Although it is possible to modify a television camera to receive infrared radiation, such modifications are both costly and time consuming. It is therefore practical not to match the camera to the light source but, vice versa, to construct the light source to meet the requirements of the camera.

The intensity of the emitted radiation must be chosen so that the object to be observed obtains just that amount of illumination which it would receive on a clear night. The military requirements also make it necessary that the lamp of the artificial light source be shaded whenever it is turned off so that its afterglow will not be observed.

It is therefore desirable to modify a "target-finding" searchlight so that it may be employed in this manner as an artificial light source. It would, for example, be possible to equip the searchlight for this purpose with an additional and separate searchlight lamp of considerably smaller power. This searchlight lamp could be chosen so that the light emitted by the searchlight illuminated an object to be observed with the required intensity of about $10^{-2}$ lux. This arrangement would have the disadvantage, however, that it would be necessary to arrange the additional searchlight lamp in front of the searchlight reflector. If the searchlight were then used in its normal mode of operation as a "target-finding" searchlight, the additional searchlight lamp would lie in the path of radiation and thus obstruct the passage of light. The addition of a low-power searchlight lamp would also increase the cost of the searchlight and require additional electric power cord as well as suitable switch gear.

It is therefore preferable to utilize the searchlight lamp provided for the normal searchlight operation for the supplementary mode of operation as well. A decrease in the light emitted by the searchlight might, for instance, be accomplished by reducing the lamp current to the point at which the object to be observed attains just the desired amount of illumination. This reduction in the lamp current results in extremely inefficient operation however, and leads to instability in the operation of the searchlight lamp. If an attempt were made to avoid the unstable character of the emitted light, the amount of this light would then again be too great. For these reasons, this type of construction is unsuitable for a searchlight which is to be used in a "passive-viewing" system.

It is conceivable, further, to maintain the current fed to the searchlight lamp at a constant level and to reduce the amount of light emitted by the searchlight by swinging an additional filter into the path of the light beam. This filter could be made to influence the wavelength of the light beam emitted by the searchlight in addition to the light beam emitted by the searchlight in addition to the intensity of the beam. In order to achieve a sufficient filtering effect, however, such a filter would have to be made with a considerable thickness. These large dimensions would make it difficult to fit this kind of filter in the searchlight housing. Since the filter would therefore be heavy the adjustable drive mechanism necessary to swivel the searchlight into and out of the path of the light beam could also only be installed in the searchlight housing with difficulty. For these reasons this kind of solution would also be unsuitable, especially when the searchlight was used for military purposes.

SUMMARY OF THE INVENTION

An object of the present invention, therefore, is to design a searchlight which can selectively emit visible or infrared radiation, where the visible light can be selectively strong or weak, such that the equipment necessary for the weak emission meets the requirements described above and is suitable, in particular, for a military searchlight.

This, as well as other objects which will become apparent in the discussion that follows, is achieved, according to the present invention, by arranging at least one red filter in a respective opening in the protective cover of the searchlight housing, with the total surface area of the red filter or filters considerably less than the area of the light-exit opening of the searchlight housing, providing a shutter between the searchlight lamp and the red filter or filters for selectively preventing light from passing through the red filter or filters and adjustable drive means for automatically closing the shutter when the searchlight lamp is turned off.

The searchlight according to the present invention, therefore, is capable of three modes of operation. It may be used to emit white-light at a normal searchlight intensity, to emit infrared radiation or to emit an only weakly visible beam of red light. In the first two modes of operation, which are designated in this specification as the "normal" modes of operation for the searchlight, the protective cover is swung away from the light-exit opening of the searchlight housing. In the last mode of operation, which is called the "supplementary" mode of operation in this specification, the protective cover is swung closed to cover the searchlight housing opening. This cover must therefore be designed so that, when it is closed, it will provide the inside of the searchlight housing with a lighttight seal. The searchlight beam is thus allowed only to emerge through the red filter or filters covering the opening or openings in the protective cover. In this mode of operation the hinged infrared filters are swung out of the path of the beam as they are in the white-light mode of operation. The red filters are arranged on the inward-facing side of the protective covers so that they completely cover the openings therein. The number and size of the openings in the protective covers are chosen so that the light emerging from the searchlight, when used in the supplementary mode of operation to assist a "passive-viewing" system, will illuminate the object to be viewed with just the required intensity of $10^{-2}$ lux. It may be preferable, in this regard, to have, instead of a number of openings, only a single opening in the protective cover.

If the searchlight lamp in this type of apparatus be switched off and the infrared filter element automatically swung into the path of the light beam, the afterglow of the searchlight lamp would ordinarily be visible—if only as infrared light —through the red filters in the protective cover. The shutter, which is arranged between the searchlight lamp and the openings, will thus serve to intercept or shade this afterglow light. This shutter may, for example, be made to swivel by an actuating member connected to an adjustable drive mechanism so that when the searchlight lamp is turned off, it will be automatically swung in front of the opening.

The apparatus according to the present invention which permits the supplementary mode of operation of the searchlight has considerable advantages over the apparatus described in the Background of the Invention, above. The expense for one or more openings in the protective covers and for the light-intercepting shutter is minimal. The total cost of the searchlight equipped with this apparatus is only inconsiderably increased even when the shutter is provided with a remote-controlled adjustable drive mechanism or is coupled with the swingable infrared filter element. The same is true for the increase in weight. The searchlight equipped in accordance with the teaching of the present invention is reliable and requires no increase in the external dimensions of the housing. It is possible, therefore, to subsequently equip searchlights for this type of supplementary operation which have originally been designed only for "target-finding." The searchlight equipped with the apparatus according to the present invention is also especially well suited for military applications. The equipment for assisting the "passive-viewing" system does not project into the path of the light beam when the searchlight is employed as a "target-finding" searchlight as it would, for example, were the searchlight provided with an additional lamp.

The amount of light passing through the red filter in the protective covers can be controlled by adjusting the position of the shutter. If the shutter is arranged to swivel, for example, it may be swung so far in the direction of the opening in the protective cover as to reduce the cross-sectional area of the opening. Thus, when the searchlight is used to assist a "passive-viewing" system, it can be adjusted to produce just the required intensity of illumination on the object to be viewed.

BRIEF DESCRIPTION OF THE DRAWINGS

FIG. 3 is a partially cutaway perspective view of a searchlight equipped with apparatus according to still another embodiment of the present invention.

FIG. 4 is a partially cutaway perspective view of a portion of a searchlight equipped with apparatus according to still another embodiment of the present invention.

FIG. 5 is a partially cutaway perspective view of a portion of the searchlight of FIG. 4.

FIG. 6 is a partially cutaway perspective view of a portion of a searchlight equipped with apparatus according to still another embodiment of the present invention.

FIG. 7 is a partially cutaway perspective view of a portion of the searchlight of FIG. 6.

DESCRIPTION OF THE PREFERRED EMBODIMENTS

Figure 1:
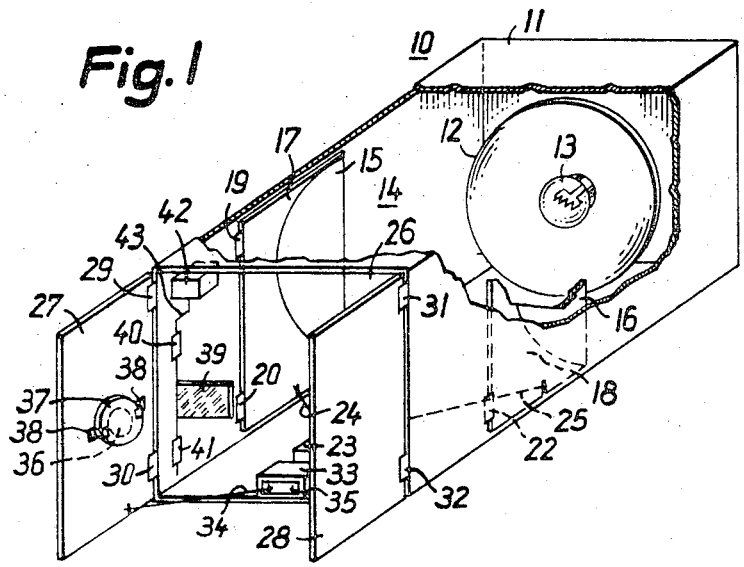
FIG. 1 is a partially cutaway perspective view of a searchlight equipped with apparatus according to one embodiment of the present invention.

Referring now to the drawings, FIG. 1 shows a searchlight 10 having a searchlight housing 11 which is partially cutaway to reveal some of the elements within it. Among these elements are a reflector 12, a searchlight lamp 13, as well as an infrared filter 14 which can be swung into the path of the searchlight beam. This infrared filter 14 is comprised of two filter halves 15 and 16 supported in opaque flaps 17 and 18. The filter halves 15 and 16, together with their flaps 17 and 18, are shown swung out of the path of the light beam so that they lie against the inner side of the searchlight housing 11. The flaps 17 and 18 are hinged to the searchlight housing 11 by means of hinges 19, 20 and 21, 22, respectively. An adjustable drive mechanism 23, provided with actuating members 24 and 25, serves to effect the swivel motion of the infrared filter 14.

Two swingable protective cover or flap halves 27 and 28 are arranged in front of the light-exit opening 26 of the searchlight housing 11. They are swingably fastened to the searchlight housing 11 by hinges or swivel joints 29, 30 and 31, 32, respectively. The swivel motion of the protective flap halves 27 and 28 is produced by an adjustable drive mechanism 33 which is connected to the protective flaps 27 and 28 through actuating members 34 and 35, respectively.

A circular opening 36 is provided in the protective flap 27 and covered by a red filter 37. The red filter is mounted by support 38 on the inside of the protective flap 27.

The opening 36 may be selectively opened or closed by an opaque shutter 39 that is arranged to swivel on hinges 40 and 41 attached to the searchlight housing 11. An adjustable drive 42 and an actuating member 43 are provided to swing the shutter 39. The shutter 39, which is arranged at the height of the opening 36, is shown in FIG. 1 in the position in which, when the protective flaps 27 and 28 are closed, the light from the lamp is prevented from passing through the opening 36. The cross-sectional area of the opening 36 may be changed by swiveling the shutter 39 to a particular angle with respect to its position, as shown, which is less than 90°.

The searchlight 10 of FIG. 1 is suited for three modes of operation. If the searchlight is set to the configuration shown with the shutter 39 swung flat against the inner wall of the searchlight housing, it will emit a strong beam of white-light. If the infrared filter 14 is then swung into the path of the light beam, the searchlight will emit a strong beam of infrared light. Finally, if the searchlight 10 is used to assist a "passive-viewing" system, it is only necessary to close the protective flaps 27 and 28. The searchlight housing 11 will, in that case, be sealed lighttight so that the light produced by the searchlight lamp 13 can only emerged as red light through the opening 36 with its red filter 37.

Whether the searchlight be set in the first, second or third mode of operation described above, when the searchlight lamp 13 is switched off, the various adjustable drive mechanisms will insure that the protective flaps 27 and 28 close and that the infrared filters 15 and 16, as well as the shutter 39, are swiveled inward to intercept the light beam. The shutter 39 thus closes the opening 36 in the protective flap 27 so that no light can emerge from the searchlight housing 11. This complete closure of the searchlight housing is necessary because the searchlight lamp 13 continues to glow after it is switched off and this afterglow would otherwise be visible through the opening 36.

Figure 2:
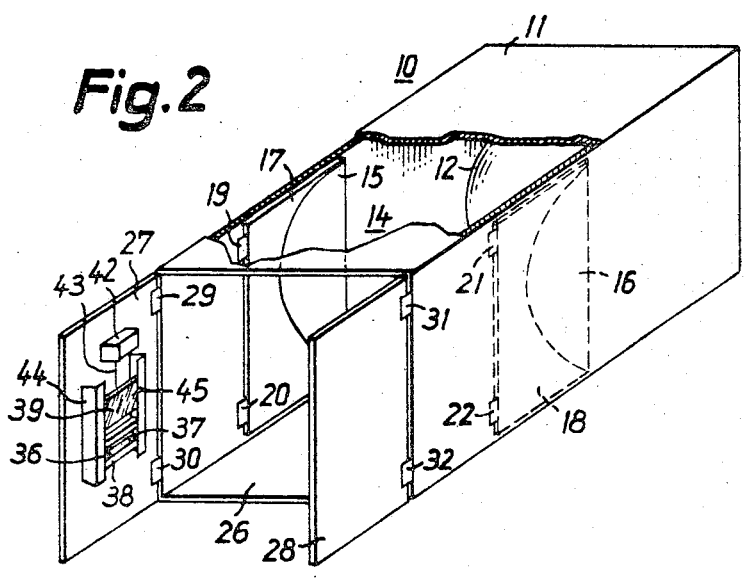
FIG. 2 is a partially cutaway perspective view of a searchlight equipped with apparatus according to another embodiment of the present invention.

The searchlight of FIG. 1 is shown again in FIG. 2 with the differences that the opening 36 has the shape of a horizontal slit and that the shutter 39 and its associated mechanical drive mechanism 42 and actuating member 43 are directly fastened to the protective flap 27. The elements of the searchlight shown in FIG. 2 are designated with the same numerals as the corresponding elements of the searchlight shown in FIG. 1. The shutter 39 is, in this case, arranged to move in the vertical direction. It is supported by guiderails 44 and 45 fastened to the protective flap 27 in such a way that it may be made to move as a slide plate. The cross-sectional area of the opening 36 may be varied by the shutter 39 by adjusting the vertical position thereof.

Figure 2A:
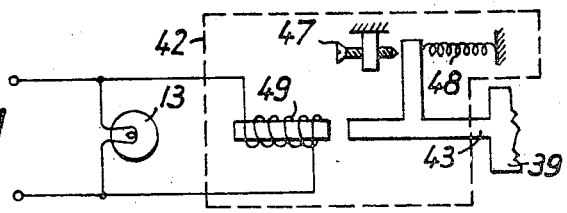
FIG. 2a is a schematic diagram of a shutter operating drive mechanism suitable for use in the searchlight of FIG. 2.

FIG. 2a schematically illustrates one way in which the adjustable drive mechanism 42 may be realized in practice. The electromagnet 49 is electrically connected in parallel with the searchlight lamp 13 so that the magnet will be excited whenever the lamp is on. The actuating member 43 of the shutter 39 is constructed as an armature which is normally biased by a spring 48 in the direction toward the right in which the shutter is closed. When the magnet 49 becomes excited it draws the armature and, in turn, the shutter toward the left as far as an adjusting screw 47 will permit. Adjustment of the open position of the shutter, the resulting cross-sectional area of the opening 36 and, thus, the amount of light emerging from the searchlight may be made by manually setting the adjusting screw.

The searchlight 10 shown in FIG. 3 differs from the searchlight of FIG. 2 only in the construction of the shutter arrangement. The shutter 39 is fastened to the flap portion 17 of the infrared filter 14. Whereas the shutter 39 shown in the searchlights of FIGS. 1 and 2 may be constructed, for example, as a rigid plate, the shutter 39 in FIG. 3 is made of a thin spring plate. The spring plate is shown in FIG. 3 in its relaxed position lying against the infrared filter half 15. When the flap 17 is swung in either direction, the shutter 39 is arranged to swing with it. If the searchlight 10 is to be operated to emit infrared light, the shutter 39 would ordinarily block a portion of the light path through the infrared filter 14. For this reason, it is also constructed to swivel independently of the swivel feature of the flaps of the infrared filter 14. The adjustable drive mechanism 42 and the actuating member 43, that, in this case, is preferably a pulling cable, serve this purpose. This cable 43 is arranged approximately parallel to one wall of the housing 11, is deflected by a roller 46 toward the shutter 39 and fastened to the shutter at the point 47. When the cable 43 is pulled, the shutter 39 is pulled away from the infrared filter half 15 so that the entire cross section of the filter half 15 may be used for the passage of light. When the infrared operation of the searchlight is ended, the cable 43 is released by the adjustable drive mechanism 42 so that the shutter 39 will flip back into its position against the infrared filter due to its own spring force.

FIG. 4 is a simplified illustration of a portion of the searchlight 10 described above showing only the infrared filter half 15 with its associated flap 17 and the protective flap half 27. The shutter 39 consists, in this case, of an opaque strip fastened to the infrared filter half 15 in the region of its closing edge. This shutter 39 can, therefore, only be moved out of the path of the light beam by swinging the infrared filter against the side of the searchlight housing. The opening 36 in the protective flap half 27, which is correspondingly arranged next to the closing edge of the flap 27, is constructed as a vertically running slit and is covered with the red filter 37. The means for fastening the red filter 37 to the flap 27 is not shown.

When the searchlight 10 of FIG. 4 is operated to emit infrared radiation, its light beam will exhibit a dark vertical strip due to the reduction, by the stationary shutter 39, of the cross-sectional area of the infrared filter half 15. Because of the small cross-sectional area of the shutter 39, however, this dark strip in the infrared light beam is tolerably insignificant. This arrangement of the shutter 39 obviates the need for mechanical guiderails, drive mechanisms, actuating members, electric cables as well as the associated control units.

The illustration in FIG. 5 shows the searchlight 10 of FIG. 4 adjusted for the supplementary mode of operation where it emits only weakly visible red light. The light-exit opening 26 is closed, lighttight, by the protective flaps 27 and 28 so that the searchlight light can only emerge through the opening 36.

FIG. 6 shows a searchlight 10 similar to the searchlights described above with the difference that the opening 36 in the protective flap 27 is arranged as a vertical slit the length of which equals the entire height of the flap 27. To this end, the protective flap 27 is reduced in width somewhat compared to the flap 28 so as to leave the opening 36 between the closing edges of the protective flaps 27 and 28 when these flaps are closed, as shown, in FIG. 7. The opening 36 is covered with a corresponding red filter 37, which extends the entire height of the protective flap 27, by fastening this flap to the flap 27 with the mounting support 38.

An opaque strip attached to the infrared filter half 15 serves as the shutter 39. As in the case of the searchlight of FIGS. 4 and 5, the shutter 39 here forms an integral part of the infrared filter half 15 and may be swung into and out of the path of light together therewith.

In the supplementary mode of operation of the searchlight 10 shown in FIG. 6 and 7 the protective flaps 27 and 28 are closed. The searchlight light can then emerge only through the slit opening 36 between the closing edges of the two protective flaps 27 and 28. Whenever the searchlight lamp is turned off, the infrared filter flaps 15 and 16 and, therewith, the shutter 39 are automatically swiveled to the position in front of the opening 36 as shown in FIG. 7 so that light can no longer emerge from the searchlight housing 11.

In particular, then, the apparatus according to the present invention may assume a number of preferred embodiments. These embodiments will now be described in detail.

The size and shape of the opening or openings in the protective cover are determined by the required intensity of illumination and the distribution of the emerging light when the searchlight is operated in the supplementary mode to assist a "passive-viewing" system. According to one embodiment of the present invention, the opening in the protective cover takes the form of a round hole. The searchlight light which emerges from this opening will have the shape of a cone and throw a localized disc of light on the object to be viewed.

A more advantageous pattern of light distribution on the object to be viewed will be achieved if, according to another embodiment of the present invention, the opening is constructed in the shape of a slit. It may be most advantageous, in this embodiment, to arrange the longer axis of the opening slit in the horizontal plane. And it may also be useful to provide a number of these opening slits so that the objects to be viewed in the supplementary mode of operation will receive uniform illumination.

In the case where the protective cover on the searchlight housing is constructed as a pair of doors or flaps, the opening, according to a further embodiment of the present invention, may be formed as a slit or crack between the closing edges of the two closed flap halves. Since the two flaps are usually hinged to swing about a vertical swivel axis, the opening formed when the flaps are closed is a vertical slit. The red filter which must be provided to cover this opening slit can be mounted on the closing edge of one of the two protective flaps. It is not necessary to make the opening slit extend from the top to the bottom of the protective flaps; it is possible, rather, to construct the flaps so that their closing edges come together to prevent light from emerging from the searchlight except in the region of the slit.

The shutter which selectively closes the opening in the protective covers is also susceptible to various modifications within the scope of the present invention. According to one preferred embodiment of the invention, the shutter is constructed as an opaque slide plate and arranged on one of the protective flaps. The opening in this protective flap may therefore be closed or partially closed by sliding the shutter across it. The shutter may, for example, be constructed to slide between two guiderails arranged on either side. An adjustable drive mechanism which, for example, may likewise be arranged on one of the protective flaps above the shutter, is provided to adjust the position of the slide plate. The control cables necessary for the operation of the adjustable drive mechanism must, in this case, be guided out to the particular protective flap on which the drive mechanism is mounted. Whenever the searchlight is operated in its normal mode, that is, to emit either white or infrared light, and the protective flaps are swung open, the mechanical drive mechanism, the shutter, the shutter guides as well as the control cables become exposed. In this position there is a danger that any one of these elements will become damaged.

For these reasons the invention also provides, according to another embodiment thereof, that the shutter be arranged on the infrared filter at the horizontal level of the opening in the protective flap so that it will effectively close the opening when the infrared filter is swung into the path of the light beam. This arrangement allows the shutter to remain inside of the searchlight housing where it is always protected against damage.

Whereas the shutter must be made of a rigid plate or the like when it is constructed as a slide plate, it is sufficient for this embodiment if the shutter be constructed as only a thin spring plate. Thus, if the spring plate be attached at one end to the infrared filter flap in such a way that in its relaxed position it lies against the infrared filter so that, when the searchlight lamp is switched off, the self-closing feature of the infrared filter will automatically swing the shutter in front of the opening, provision may easily be made to swing the shutter out of the path of the searchlight beam when the searchlight is to be used to emit infrared light. It is necessary only to pull the spring plate shutter by means of an adjustable drive mechanism and, for example, a length of cable against its own spring force away from the infrared filter. When the infrared operation is terminated and the searchlight lamp is switched off, the drive mechanism can be constructed to release the cable to allow the spring plate to flop back again against the infrared filter under its own spring force. If, then, the protective flaps on the searchlight housing are also closed, the spring plate will cover the opening in the flaps.

According to a still further embodiment of the present invention, the shutter is rigidly mounted to the infrared filter so that its position is exclusively determined by the position of the filter. This arrangement obviates the necessity of a separate adjustable drive mechanism and actuating members for the shutter. The shutter may be formed, for example, by an opaque layer or sheet on the infrared filter arranged at the height or level of the opening in the protective flaps. The shutter may, for example, be cemented onto the glass side of the filter. Although this type of filter arrangement reduces the cross-sectional area of the infrared filter, this reduction is tolerable in practice if the opening in the protective flaps and, in turn, the size of the shutter is of small cross section. The infrared light beam will, in fact, exhibit a dark section; however, this dark section will be of only inconsiderable influence on the light beam and will be visible only at short distances.

It is also possible, when making the shutter a fixed element of the infrared filter, to arrange the same at the closing edges of the two flaps which form the infrared filter. This arrangement is suitable for the embodiment described above wherein the opening in the protective flaps is constructed as a slit between the two closed flaps. This arrangement is particularly advantageous because it allows searchlights of the type used in only the normal mode of operation to be modified for a supplementary mode of operation with only small changes in construction. It is only necessary to provide the slit between the closed protective flaps, cover it with a red filter, and attach the appropriately dimensioned shutter to the infrared filter.

The lighttight closing of the searchlight housing is provided in the main, in this case, by the protective flaps which, when closed, leave a crack or slit between their closing edges. The lighttight closing of the slit is effected by the opaque strip which is arranged at the closing edges of the infrared filter flaps at the same horizontal level as the slit.

Whenever the searchlight lamp is turned off, therefore, the afterglow of the lamp will be completely shaded because both the protective flaps as well as the infrared filter flaps will be closed.

It will be understood that the above description of the present invention is susceptible to various modifications, changes, and adaptations, and the same are intended to be comprehended within the meaning and range of equivalents of the appended claims.

I claim:

1. A searchlight comprising, in combination:
   a. a searchlight lamp for the emission of light;
   b. a searchlight housing enclosing said lamp having a first light aperture;
   c. pivotally mounted housing closure means for selectively closing said first light aperture, said closure means having a second light aperture substantially smaller than said first light aperture;
   d. red filter means arranged in said second light aperture;
   e. light shutter means arranged between said lamp and said second light aperture for selectively closing said second light aperture while said closure means are in a position wherein said first light aperture is closed; and
   f. means for selectively closing said shutter means, whereby said searchlight emits a strong searchlight beam when said first light aperture is not closed by said closure means, a weak searchlight beam when said first light aperture is closed by said closure means but said second light aperture is not closed by said shutter means, and no light when said first light aperture is closed by said closure means and said second light aperture is closed by said shutter means.

2. A searchlight as defined in claim 1 wherein said first light aperture contains an infrared filter and wherein means are provided for selectively placing said first light aperture in the path of the beam of light from said searchlight lamp.

3. In a searchlight having a light source, a searchlight housing with a light-exit opening, an infrared filter arranged in the housing to be selectively swung into the path of the searchlight beam and a protective cover arranged in front of said light-exit opening to selectively close said exit opening, the improvement comprising red filter means arranged in an opening in said protective cover, said red filter means having a surface area considerably less than the area of said opening in said housing, shutter means arranged between said light source and said red filter means for selectively preventing light from passing through said red filter, and means for automatically closing said shutter means when said light source is turned off.

4. The improvement defined in claim 3, wherein said protective cover is swivally connected to said housing.

5. The improvement defined in claim 3, wherein said opening in said protective cover is disc-shaped.

6. The improvement defined in claim 3, wherein said opening in said protective cover is slit-shaped.

7. The improvement defined in claim 3, wherein said protective cover includes two flaps, each of which is swivally connected to said housing, and wherein said opening in said protective cover is formed as a slit between said two flaps when said flaps are in the closed position.

8. The improvement defined in claim 3, wherein said shutter means includes an opaque slide plate arranged to slide on said protective cover.

9. The improvement defined in claim 3, wherein said shutter means includes flap means attached to said infrared filter for selectively preventing the transmission of light from said light source to said red filter, and wherein said flap means is arranged to be swung into said light transmission preventing position when said infrared filter is swung into the path of the searchlight beam when said light source is turned off and to be swung out of said light transmission preventing position when said infrared filter is swung out of the searchlight beam and when said searchlight is operated to emit infrared light.

10. The improvement defined in claim 3, wherein said shutter means includes means rigidly attached to said infrared filter for selectively preventing the transmission of light from said light source to said red filter, said light transmission preventing means arranged to be swung into and out of said light transmission preventing position by said infrared filter.